United States Patent
Li

(10) Patent No.: US 11,482,218 B2
(45) Date of Patent: Oct. 25, 2022

(54) VOICE CONTROL METHOD, VOICE CONTROL DEVICE, AND COMPUTER-EXECUTABLE NON-VOLATILE STORAGE MEDIUM

(71) Applicant: BOE TECHNOLOGY GROUP CO., LTD., Beijing (CN)

(72) Inventor: Yingjie Li, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 270 days.

(21) Appl. No.: 16/641,704

(22) PCT Filed: Jan. 22, 2019

(86) PCT No.: PCT/CN2019/072693
§ 371 (c)(1),
(2) Date: Feb. 25, 2020

(87) PCT Pub. No.: WO2020/150899
PCT Pub. Date: Jul. 30, 2020

(65) Prior Publication Data
US 2021/0151045 A1    May 20, 2021

(51) Int. Cl.
| | |
|---|---|
| G10L 15/08 | (2006.01) |
| G10L 15/18 | (2013.01) |
| G10L 15/22 | (2006.01) |
| G06F 3/16 | (2006.01) |
| G06F 9/451 | (2018.01) |

(52) U.S. Cl.
CPC ............ *G10L 15/22* (2013.01); *G06F 3/167* (2013.01); *G06F 9/451* (2018.02); *G10L 15/08* (2013.01); *G10L 15/1822* (2013.01); *G10L 2015/223* (2013.01)

(58) Field of Classification Search
CPC ......... G06F 3/167; G09F 9/451; G10L 15/08; G10L 15/22; G10L 15/1822; G10L 2015/223
See application file for complete search history.

(56) References Cited

U.S. PATENT DOCUMENTS

| | | | | |
|---|---|---|---|---|
| 5,890,122 A | * | 3/1999 | Van Kleeck | G10L 15/26 704/275 |
| 7,831,542 B2 | * | 11/2010 | Milov | G06F 11/3692 707/602 |

(Continued)

FOREIGN PATENT DOCUMENTS

| | | | |
|---|---|---|---|
| CN | 104599669 A | | 5/2015 |
| CN | 106098061 A | | 11/2016 |

(Continued)

*Primary Examiner* — Daniel C Washburn
*Assistant Examiner* — Oluwadamilola M Ogunbiyi
(74) *Attorney, Agent, or Firm* — Leason Ellis LLP

(57) ABSTRACT

A voice control method, includes: acquiring a voice input information; recognizing the voice input information to obtain a voice command; based on the voice command, determining a control corresponding to the voice command by a test framework calling unit, where the test framework calling unit is not in an application program in which the control is coded; and executing a function corresponding to the control. A voice control device and a computer-executable non-volatile storage medium are further provided.

20 Claims, 3 Drawing Sheets

(56) References Cited

U.S. PATENT DOCUMENTS

| | | | |
|---|---|---|---|
| 8,171,406 B1* | 5/2012 | Newstadt | G06F 9/451 715/764 |
| 10,367,834 B2* | 7/2019 | Sweet | H04L 63/0236 |
| 10,573,303 B2 | 2/2020 | Shi et al. | |
| 2005/0165609 A1* | 7/2005 | Zuberec | G10L 15/22 704/270 |
| 2011/0208822 A1* | 8/2011 | Rathod | G06F 16/9535 709/206 |
| 2012/0176313 A1* | 7/2012 | Ryu | G10L 15/26 345/158 |
| 2012/0327484 A1* | 12/2012 | Lee | G06F 3/0486 358/452 |
| 2013/0124207 A1* | 5/2013 | Sarin | G06F 3/167 704/275 |
| 2013/0159417 A1* | 6/2013 | Meckler | H04L 67/535 709/204 |
| 2014/0278440 A1* | 9/2014 | Chung | G10L 15/26 704/275 |
| 2014/0343950 A1* | 11/2014 | Simpson | G10L 15/22 704/275 |
| 2015/0261391 A1* | 9/2015 | Herlitz | G06F 8/38 715/821 |
| 2015/0355829 A1* | 12/2015 | Feri | H05B 47/155 715/771 |
| 2016/0284351 A1* | 9/2016 | Ha | G10L 15/22 |
| 2017/0060264 A1* | 3/2017 | Gasselin de Richebourg | G06F 3/03547 |
| 2017/0133009 A1* | 5/2017 | Cho | G10L 15/22 |
| 2017/0168676 A1* | 6/2017 | Calder | G06F 3/0482 |
| 2018/0136806 A1* | 5/2018 | Kasahara | G06F 21/36 |
| 2018/0341466 A1* | 11/2018 | Upadhyay | G10L 15/22 |
| 2019/0004687 A1* | 1/2019 | Gajulapally | G06F 3/04845 |
| 2019/0051289 A1* | 2/2019 | Yoneda | G10L 15/07 |
| 2019/0205090 A1* | 7/2019 | Ohnishi | G06F 3/167 |
| 2019/0317725 A1 | 10/2019 | Shi | |
| 2019/0378512 A1* | 12/2019 | Liu | G06F 16/90335 |
| 2020/0073629 A1* | 3/2020 | Lee | G06F 3/0482 |
| 2020/0243080 A1* | 7/2020 | Park | H04L 51/046 |
| 2020/0400586 A1* | 12/2020 | Reynaud | G06T 7/0002 |
| 2021/0124422 A1* | 4/2021 | Forsland | G06F 3/167 |

FOREIGN PATENT DOCUMENTS

| | | | | |
|---|---|---|---|---|
| CN | 106504748 A | 3/2017 | | |
| CN | 108279839 A | 7/2018 | | |
| CN | 109089140 A | 12/2018 | | |
| WO | WO-2014106433 A1 * | 7/2014 | | G10L 15/26 |
| WO | 2016160852 A1 | 10/2016 | | |
| WO | WO-2019135623 A1 * | 7/2019 | | G06F 3/0484 |

* cited by examiner

VOICE CONTROL METHOD, VOICE CONTROL DEVICE, AND COMPUTER-EXECUTABLE NON-VOLATILE STORAGE MEDIUM

CROSS-REFERENCE TO RELATED PATENT APPLICATIONS

This application is a U.S. National Stage Application under 35 U.S.C. § 371 of International Patent Application No. PCT/CN2019/072693, filed Jan. 22, 2019, which is incorporated by reference in its entirety.

TECHNICAL FIELD

Embodiments of the present disclosure relate to a voice control method, a voice control device corresponding to the voice control method, and a computer-executable non-volatile storage medium.

BACKGROUND

With the rapid popularization of smart phones, the mobile internet is also developing rapidly. With intelligent operating systems and the mobile internet both being rapidly developing, the Android operating system has become the most widely used operating system for all kinds of intelligent devices due to the advantages thereof such as open source and deep customization. There are many kinds of devices running the Android operating system, and voice interaction is becoming more and more common among these devices.

However, although a large number of applications (APP) can already be installed and used free of charge in the Android ecosystem, most of these APPs use touch operations inputted by users to mobile phone devices. In order to use a kind of natural interactive voice control, APPs need to be re-developed. In this way, in addition to the heavy workload, cooperation with third-party APP companies may further be involved with high time and economic costs.

SUMMARY

According to at least one embodiment of the present disclosure, a voice control method is provided, which includes: acquiring a voice input information; recognizing the voice input information to obtain a voice command; determining a control corresponding to the voice command by a test framework calling unit based on the voice command, wherein the test framework calling unit is not in an application program in which the control is coded; and executing a function corresponding to the control.

For example, determining the control corresponding to the voice command by the test framework calling unit based on the voice command includes: acquiring a control in an application program that is in a foreground running state on a current user interface by the test framework calling unit; acquiring a character string of the control or a description character string of the control; and matching the voice command with the character string of the control or the description character string of the control to determine the control corresponding to the voice command.

For example, the voice command further includes a command parameter, wherein determining the control corresponding to the voice command by the test framework calling unit based on the voice command further includes: acquiring a position of the control in the application program that is in the foreground running state on the current user interface by the test framework calling unit; and determining whether an edit box is located on at least one position adjacent to the position of the control by the test framework calling unit, and in a case where one or more of edit boxes are determined, inputting the command parameter into any of the edit boxes; and wherein executing the function corresponding to the control includes: based on the command parameter, executing the function corresponding to the control.

For example, determining whether the edit box is located on at least one position adjacent to the position of the control includes: searching all edit boxes on the current user interface; recognizing a boundary of each of the edit boxes; and based on the boundary, determining a position of an edit box located on at least one position adjacent to the position of the control.

For example, recognizing the voice input information to obtain the voice command includes: converting the voice input information into a character string; matching the character string which is obtained by the converting with a preset voice command; and based on a matching result, determining a voice command corresponding to the voice input information.

For example, matching the character string which is obtained by the converting with the preset voice command includes: establishing a corresponding relationship set of character strings and preset voice commands; based on template matching or deep learning, determining a voice command matched with the character string which is obtained by the converting in the set; and matching the character string with the voice command which is determined.

For example, determining the control corresponding to the voice command by the test framework calling unit based on the voice command includes: based on a test framework called by the test framework calling unit, acquiring an image of an application program that is in a foreground running state on a current user interface; recognizing the image to determine a control icon in the image; and matching the voice command with the control icon to determine the control corresponding to the voice command.

For example, determining the control corresponding to the voice command by the test framework calling unit based on the voice command further includes: in a case where a matching process of the voice command with the character string of the control or the description character string of the control is unsuccessful, based on a test framework called by the test framework calling unit, acquiring an image of the application program that is in the foreground running state on the current user interface; recognizing the image to determine a control icon in the image; and matching the voice command with the control icon to determine the control corresponding to the voice command.

For example, determining the control corresponding to the voice command by the test framework calling unit based on the voice command further includes: in a case where a matching process of the voice command with the control icon is unsuccessful, acquiring a control in the application program that is in the foreground running state on the current user interface by the test framework calling unit; acquiring a character string of the control or a description character string of the control; and matching the voice command with the character string of the control or the description character string of the control to determine the control corresponding to the voice command.

For example, recognizing the image to determine the control icon in the image includes: performing contour extraction on the image to obtain at least one control region; and performing image recognizing on the at least one control region to determine the control icon in the control region.

For example, matching the voice command with the control icon to determine the control corresponding to the voice command includes: converting the control icon into a character string corresponding to a function of the control, and matching the character string which is corresponding to the function of the control with the voice command; or, converting the voice command into an icon corresponding to the voice command, and matching the icon which is corresponding to the voice command with the control icon.

For example, before acquiring the voice input information, the method further including: acquiring an application program starting command; and based on the application program starting command, starting the application program in which the control is coded.

According to at least one embodiment of the present disclosure, a voice control device is provided, which includes: a voice recognizing and semantic parsing unit, configured to acquire a voice input information, and to recognize the voice input information to obtain a voice command; a test framework calling unit, configured to, based on the voice command, determine a control corresponding to the voice command, wherein the test framework calling unit is not in an application program in which the control is coded; and an execution unit, configured to execute a function corresponding to the control.

For example, the device further includes: an image recognizing unit, configured to recognize an image in an application program in which the control is coded on a current user interface to determine a control icon in the image, wherein the test framework calling unit is further configured to match the voice command with the control icon to determine the control corresponding to the voice command.

For example, the voice recognizing and semantic parsing unit is in a first module, the test framework calling unit and the image recognizing unit are in a second module, respectively, and the first module and the second module communicate with each other through inter-process communication.

According to at least one embodiment of the present disclosure, a voice control device is provided, which includes: a memory and a processor, wherein instructions are stored in the memory, and in a case where the processor processes the instructions, the processor executes the method mentioned above.

According to at least one embodiment of the present disclosure, a computer-executable non-volatile storage medium is provided, in which computer program instructions are sorted, wherein in a case where a processor processes the instructions, the processor executes the method mentioned above.

BRIEF DESCRIPTION OF THE DRAWINGS

In order to more clearly illustrate the technical solution of the embodiments of the present disclosure, the accompanying drawings needed in the description of the embodiments will be briefly described in the following. The accompanying drawings in the following description are merely exemplary embodiments of the present disclosure.

DETAILED DESCRIPTION

Figure 1:
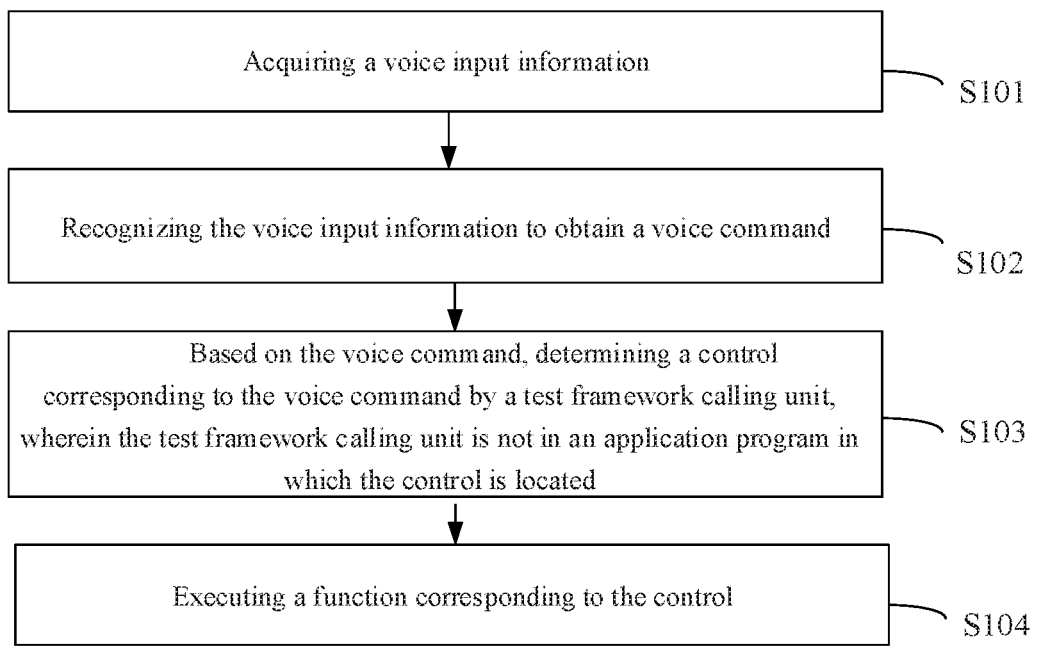
FIG. 1 shows a flowchart diagram of a voice control method according to an embodiment of the present disclosure.

Hereinafter, preferred embodiments of the present disclosure will be described in detail with reference to the accompanying drawings. Note that in this specification and the accompanying drawings, steps and elements that are substantially the same are denoted by the same reference numerals, and repeated explanation of these steps and elements will be omitted.

In the embodiments of the present disclosure, a voice control method and a voice control device, and a computer-executable non-volatile storage medium can be applied to electronic devices such as mobile terminals, personal computers, portable computers, etc. The voice control method of the embodiments of the present disclosure can be executed on the electronic devices. For example, the voice control method of the embodiments of the present disclosure are implemented in application programs, and the electronic devices are installed with the application programs configured to implement the voice control methods, or is implemented by installing with a chip or a processor including the voice control device or the storage medium of the embodiments of the present disclosure. In this way, after executing the voice control method, the voice control device or the storage medium of the embodiments of the present disclosure, a voice control can be performed on any one of other application programs installed in the electronic devices (also called as third-party application programs) to realize voice interaction even if such a third-party application program itself has no voice control function. In the case where the third-party application program has a voice control function, the user can further choose not to apply the voice control function of the third-party application program itself but choose to apply the voice control function of the embodiments of the present disclosure, thereby giving the user more experience of choice. In this way, the voice control method or the voice control device of the embodiments of the present disclosure can realize the voice control and management for the third-party application programs with the codes of the third-party application programs that are not modified and the codes of an operating system that is not modified as well, thus enhancing the function of the electronic devices, and facilitating the usage of users.

FIG. 1 describes a flowchart diagram of a voice control method 100 according to an embodiment of the present disclosure. The voice control method of the embodiment of the present disclosure will be described below with reference to FIG. 1. Referring to FIG. 1, the voice control method 100 may include steps S101-S104.

In step S101, a voice input information is acquired. According to an example of the present disclosure, a voice input of the user can be received through a microphone device of an electronic device as the voice input information, and the voice input information is configured to control a control in a third-party application program, so that the user can interact with the third-party application program through the voice input information. For example, through a microphone, the voice input by the user such as "search", "slide up", etc., can be obtained as the voice input information.

In an example, before acquiring the voice input information used by the user to control the control in a third-party application program, the third-party application program can be started by the voice at first. For example, firstly, an application program starting voice command inputted by the user is acquired through a voice input interface of the electronic device, and based on the application program starting voice command of the voice control method, the third-party application program is started. For example, through a program of the voice control method, voice "open WeChat" is inputted to start the third-party application program "WeChat". Of course, the third-party application program can be started by touching or clicking an application program icon.

In step S102, the voice input information is recognized to obtain a voice command According to an example, the voice input information may be converted into a character string, the character string which is obtained by the converting is matched with a preset voice command, and based on a matching result, a voice command corresponding to the voice input information is determined. For example, the voice command may be a control command that can control the electronic device. For example, the corresponding relationship set between character strings and preset voice commands can be defined in advance. For example, the voice command "slide up" corresponds to a set of character strings such as {"swipe up", "pull up", "slide up"}, and the operation corresponding to the voice command is a pull up operation to a slidable control. If the user's voice input information includes at least one of the character strings "swipe up", "pull up", and "slide up", the voice command "slide up" can be matched. Further, for example, the voice command "search" corresponds to a set of character strings such as {"search", "find"}, and the operation corresponding to the voice command is to click on a search control. If the user's voice input information includes at least one of the character strings "search", and "find", the voice command "search" can be matched.

In an example, when the character string, which is obtained by converting, is matched with the voice command, based on template matching or deep learning, the voice command matched with the character string, which is obtained by converting, in the set is determined, and the character string is converted into the determined voice command. In addition, these voice commands which are supported and character strings which are corresponding to these voice commands can be infinitely expanded, and elements in the character string set corresponding to the voice commands can be added as desired.

According to the embodiments of the present disclosure, a voice command may include only one command, and a voice command may also include a voice command and a command parameter. When the character string which is obtained by converting is matched with the preset voice command, the command parameter included in the voice command can be recognized and matched while the voice command is matched. For example, the matching result may include at least three types. The first type has only the matched voice command, such as "swipe up", and a parsed result is a command "slide up". The second type includes the voice command and the command parameter corresponding to the voice command, for example, the matching result of the character string "I want to search Andy Lau" is the voice command: "search", and the command parameter: "Andy Lau". Further, for example, the matching result of the character string "display forgetting water" is the voice command: "display", the command parameter: "forgetting water". The third type is for operations that do not match the preset voice command, for example, for the character string "forgetting water", the voice command is recognized to be "forgetting water".

In step S103, based on the voice command, a control corresponding to the voice command is determined by a test framework calling unit, and the test framework calling unit is not in an application program in which the control is coded. In other words, the application program in which the control is coded is different from the program in which the test framework call unit is coded.

The test framework calling unit refers to a program used to call functions of a test framework. The testing framework is a software library configured to perform automated testing, and is a function of an operating system such as Android. For example, the testing framework is a user interface automatic test framework (uiautomator). The uiautomator test framework can obtain the property information of controls or controls presented on the current user interface. For example, the control hierarchy and the property information of the current window can be obtained, and a target control is found. If there is a click event, coordinates of the center point of the control can further be calculated, etc. In addition, the uiautomator test framework can inject a user event (operation such as clicking, inputting class, or the like) through a hidden interface, thus realizing the purpose of cross-process automation. In addition, besides the uiautomator test framework, there are other test frameworks such as an appuium test framework, and this disclosure is not limited to the above cases.

In the embodiments of the present disclosure, the control requiring the voice control is in the third-party application program in the electronic device. The test framework calling unit configured to call the test framework is in a program other than the third-party application program. Therefore, the application program in which the control is coded is not the same application program as the program in which the test framework call unit is coded.

According to an example of the present disclosure, during the process of determining a control corresponding to the voice command by the test framework calling unit, a control object on the current user interface can be acquired at first by the test framework calling unit. For example, by the uiautomator test framework, all control objects in the third-party application window are acquired. Then, the character string of the control object or the description character string of the control are obtained. For example, the character string or the control description character string of the control object is recognized by an optical character recognition (OCR). For example, the character strings of text "search", "copy", and "exit" on the control object is recognized. After that, the voice command is matched with the character string of the control object or the description character string of the control to determine the control corresponding to the voice command. For example, the voice command such as "search", etc., is matched with the character strings of text "search", "copy", and "exit" on the control object to determine the control "search" which is matched.

According to an example of the present disclosure, in the case where the voice command further includes a command parameter, during the process of determining the control corresponding to the voice command by the test framework calling unit, the command parameter is required to be further processed. For example, after calling the test frame by the test framework calling unit to determine the control, the position of the control on the current user interface or the third-party application window is further acquired by the test framework calling unit. Then, whether an edit box is located on at least one position adjacent to the position of the control is determined by the test framework calling unit. For example, whether the edit box is located in an upper region of the control is determined, if the edit box is not located in the upper region of the control, whether the edit box is located in a left region of the control is determined. When it is determined that the edit box is found, the command parameter is inputted into the edit box. Then, the control is operated based on the command parameter to execute the function corresponding to the control. For example, after entering "forgetting water" in the edit box, the control "search" is clicked to search "forgetting water".

In an example, when whether an edit box is located on at least one position adjacent to the position of the control is determined, all edit boxes in the third-party application windows can be found by the find objects function of the uiautomator test framework. Then, for each of the edit boxes, the boundary of the edit box may be acquired. In this way, the position coordinates of the edit box are obtained, and the position relationship between the edit box and the control is determined according to the position coordinates of the edit box.

Because some controls have no text but icons thereon, for example, usually a magnifying glass icon instead of the word "search" is located on the control "search". Therefore, according to an example of the present disclosure, the control corresponding to the voice command can further be found by way of image recognition. For example, in the case where the control cannot be found by way of character string matching, or, even if the control is found, the edit box cannot be found near the control, the way of image recognition can be adopted to find the control. Of course, those skilled in the art understand that the control corresponding to the voice command can be determined by arbitrarily selecting or simultaneously selecting the way of character string to match the control and the way of image recognition to match the control, and the two ways have no priority order.

According to an example of the present disclosure, when the control is matched by way of image recognition, based on the test framework called by the test framework calling unit, the image of the current user interface is acquired at first. For example, the image of the application program that is in the foreground running state on the current user interface is acquired. Then, the image is recognized, and one or more control icons in the third-party application program in the foreground running state in the image are located. For example, contour extraction is performed on the image, and one or more control regions are obtained. Then, the image recognition is performed on the one or more control regions to determine the description character string of the control or the control icon in the control regions. By way of acquiring the control region at first, the recognition range of the control icon can be reduced, the calculation amount can be reduced, and the recognition efficiency can be improved.

If the character string of the control is recognized, the character string corresponding to the voice command is matched with the character string of the control to determine the control corresponding to the voice command. If the control icon is recognized, the voice command is matched with the control icon to determine the control corresponding to the voice command. For example, the control icon is converted into the character string corresponding to the function of the control, and the character string which is corresponding to the voice command is matched with the character string which is corresponding to the control icon to determine the control corresponding to the voice command. Further, for example, the voice command may further be converted into an icon corresponding to the voice command, and the icon which is corresponding to the voice command is matched with the control icon to determine the control corresponding to the voice command. For example, the character string corresponding to the voice command "search" includes "search" and "find" as well as icons, such as "magnifying glass icon". The "magnifying glass icon" is matched with the control icon. In the case where a control icon is determined to be the "magnifying glass icon", the control may be determined to be the "search control".

In an example, the matching technology of the voice command icon and the control icon can use image recognition such as image feature matching, deep learning, or the like. When image features are matched, the image features of the voice command icon and the control icon, such as contour feature, may be extracted, respectively, and the image features of the two are used to match; if the matching rate is greater than a matching threshold, for example 80%, the voice command icon and the control icon are considered to be the same icon.

In an example, after recognizing the control region, if no text is recognized, then the image recognition is performed on the control region. If text is recognized, the image recognition is no longer performed on the control region to avoid unnecessary calculations and improve the recognition efficiency. If the voice command can be matched with the icon or the character string of the control region, the control region is determined to be the control. For example, if the matching process of the voice command with the character string of the control or the description character string of the control is performed unsuccessfully, based on the test framework called by the test framework calling unit, the image of the application program that is in the foreground running state on the current user interface is acquired, then the image is recognized to determine the control icon in the image; and then, the voice command is matched with the control icon to determine the control corresponding to the voice command.

In another example, the control corresponding to the voice command can be found by way of image recognition. If the image is not recognized by way of image recognition, then the control region is recognized by way of text recognition, which can also avoid unnecessary calculations and save system resources. For example, if the matching process of the voice command with the control icon is unsuccessful, the control in the application program that is in the foreground running state on the current user interface is acquired by the test framework calling unit, then, the character string of the control or the description character string of the control is acquired, and the voice command is matched with the character string of the control or the description character string of the control to determine the control corresponding to the voice command.

In step S104, the function corresponding to the control is executed. According to an example, according to properties of the control, according to the voice command, operations of the control such as clicking, double-clicking or dragging are executed. If the voice command further includes a command parameter, the control can be operated according to the command parameter. For example, if the command parameter "forgetting water" is in the edit box, clicking is executed on the control "search" to search "forgetting water".

The voice control method of an embodiment of the present disclosure, by calling the test framework of the operating system, can realize the voice control of the third-party application program, in the case where the codes of the third-party application program and the codes of the operating system are not need to be modified, so the function of electronic device is expanded, and the operations of users is facilitated.

The voice control method according to an embodiment of the present disclosure has been described above, and the voice control device according to an embodiment of the present disclosure will be further described below. The voice control device is corresponding to the voice control method of previous embodiment, and for the sake of simplicity of the description, only a brief introduction will be made below. For details, reference may be made to all previous embodiments.

Figure 2:
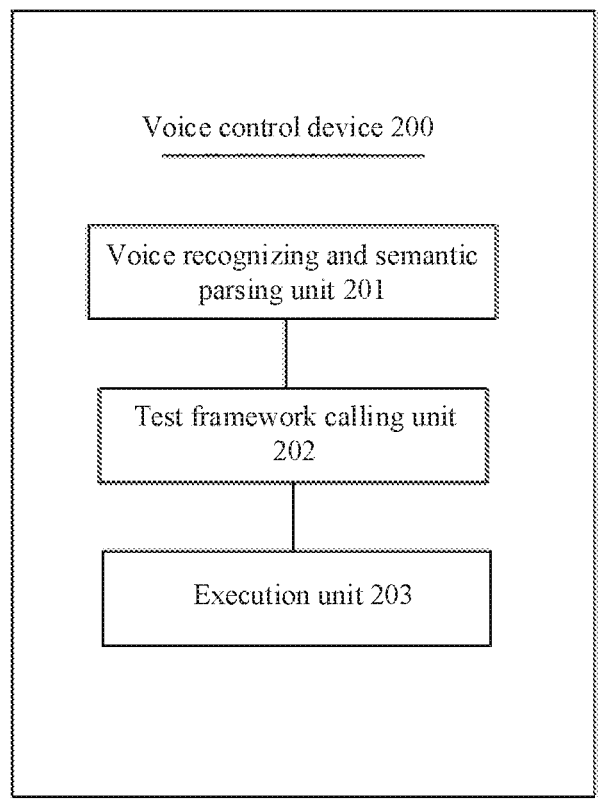
FIG. 2 shows a structural schematic diagram of a voice control device according to an embodiment of the present disclosure.

FIG. 2 shows a structural schematic diagram of a voice control device according to an embodiment of the present disclosure. Referring to FIG. 2, the voice control device 200 includes a voice recognizing and semantic parsing unit 201, a test framework calling unit 202 and an execution unit 203. The voice recognizing and semantic parsing unit 201 is configured to acquire a voice input information, and to recognize the voice input information to obtain a voice command. The test framework calling unit 202 is configured to, based on the voice command, determine a control corresponding to the voice command, and the test framework calling unit is not in an application program in which the control is coded; that is, the program in which the control is coded is different from the application program in which the test framework call unit is coded. The execution unit 203 is configured to execute a function corresponding to the control. In the embodiments of the present disclosure, the voice recognizing and semantic parsing unit 201, the test framework calling unit 202, and the execution unit 203 which are mentioned above may be implemented in the form of a software, a hardware or a firmware, and for example, may be implemented by a computer program, a programmable logic circuit, a chip or a chip set.

Figure 3:
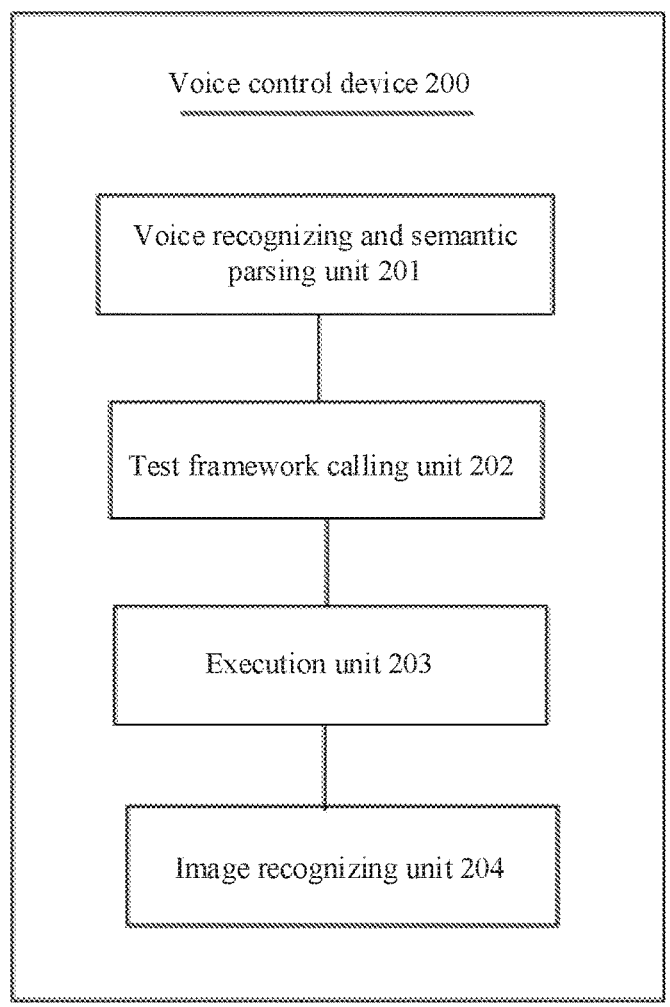
FIG. 3 shows a structural diagram of an embodiment of a voice control device according to an embodiment of the present disclosure.

FIG. 3 shows a structural diagram of an embodiment of a voice control device according to an embodiment of the present disclosure. Referring to FIG. 3, in order to recognize the image on a user interface, the voice control device 200 further includes an image recognizing unit 204. The image recognizing unit 204 is configured to recognize the image on the user interface. For example, the image in an application program that is in the foreground running state on the current user interface is recognized to determine the control icon in the image in the application program. In addition, the test framework calling unit 202 is further configured to match the voice command with the control icon to determine the control corresponding to the voice command. In the embodiments of the present disclosure, the voice recognizing and semantic parsing unit 201, the test framework calling unit 202, the execution unit 203, and the image recognizing unit 204 which are mentioned above may be implemented in the form of a software, a hardware or a firmware, for example, may be implemented by a computer program, a programmable logic circuit, a chip or a chip set.

Figure 4:
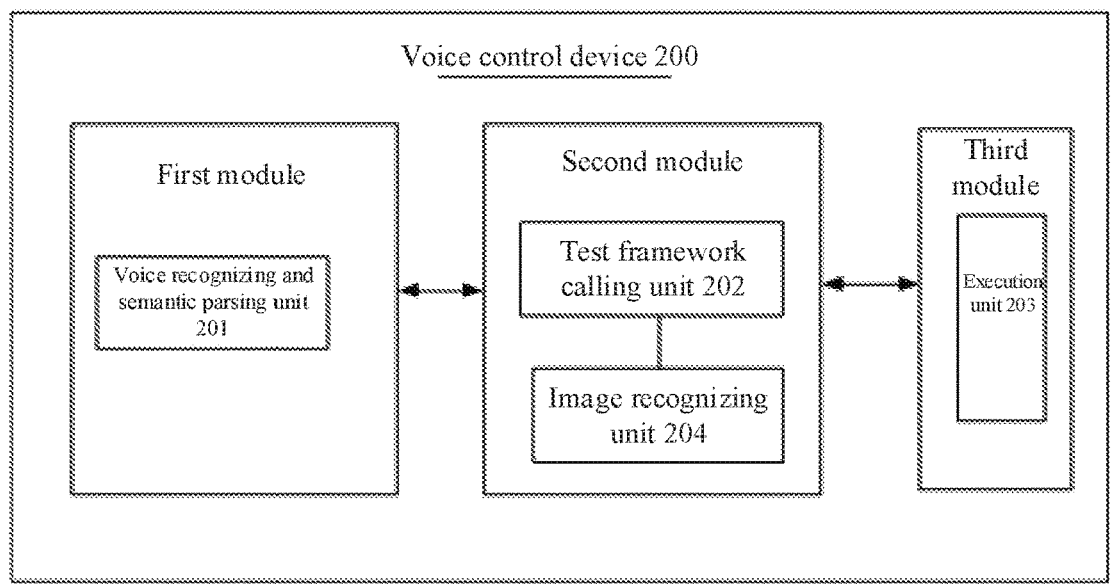
FIG. 4 shows an architecture diagram of a voice control device according to an embodiment of the present disclosure.

FIG. 4 shows an architecture diagram of a voice control device according to an embodiment of the present disclosure. Referring to FIG. 4, the voice recognizing and semantic parsing unit 201 is in a first module, the test framework calling unit 202 and the image recognizing unit 204 are in a second module, respectively, and the first module and the second module communicate with each other through inter-process communication. In addition, the execution unit 203 may be in a third module. For example, the execution unit 203 may be configured to call a control execution function which is built in the operating system itself.

Figure 5:
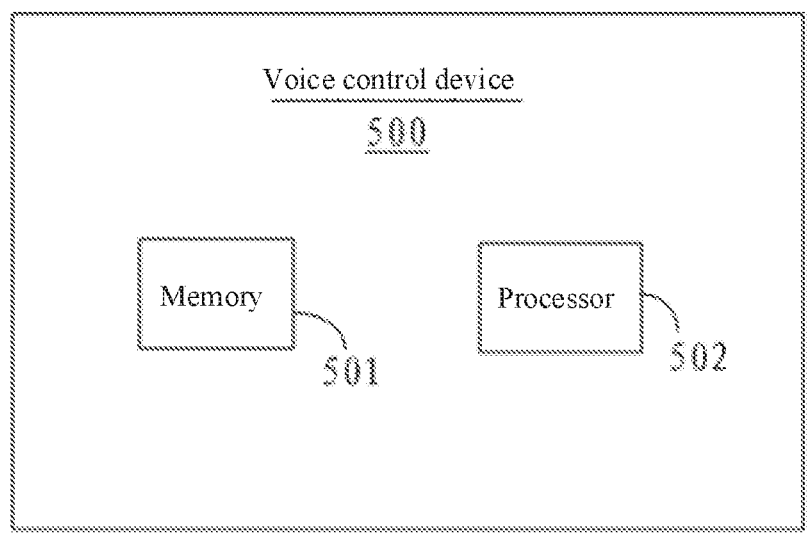
FIG. 5 shows a structural diagram of another voice control device according to an embodiment of the present disclosure.

FIG. 5 shows a structural diagram of another voice control device according to an embodiment of the present disclosure. Referring to FIG. 5, the voice control device 500 includes a memory 501 and a processor 502. Instructions are stored in the memory 501, and when the processor 502 processes the instructions, and the processor executes the voice control method mentioned above.

According to an embodiment of the present disclosure, a computer-executable non-volatile storage medium is further provided, computer program instructions are sorted in the non-volatile storage medium, and when the processor in the computer processes the instructions, and the processor executes the voice control method mentioned above.

Those ordinarily skilled in the art will recognize that elements and algorithm steps of the embodiments described in combination with the embodiments disclosed in the present disclosure can be implemented in an electronic hardware, a computer software, or any combination thereof. Software modules may be placed in any form of computer storage medium. In order to clearly illustrate an interchangeability of hardware and software, the composition and steps of each embodiment have been described generally in terms of function in the above description. Whether these functions are implemented in hardware or software depends on the specific application and design constraints of the technical solution. Those skilled in the art may use different methods to implement the described functions for each specific application, but such implementation should not be considered beyond the scope of the present disclosure.

Those skilled in the art will understand that various modifications, combinations, partial combinations and substitutions can be made to the present disclosure depending on design requirements and other factors as long as these are within the scope of the appended claims and their equivalents.

What is claimed is:

1. A voice control method, comprising:
   acquiring a voice input information;
   recognizing the voice input information to obtain a voice command;
   determining a control corresponding to the voice command by a test framework calling unit based on the voice command, wherein the test framework calling unit is not in an application program in which the control is coded; and
   executing a function corresponding to the control,
   wherein determining the control corresponding to the voice command by the test framework calling unit based on the voice command comprises:
   acquiring a control in an application program that is in a foreground running state on a current user interface by the test framework calling unit;
   acquiring a character string of the control or a description character string of the control; and
   matching the voice command with the character string of the control or the description character string of the control to determine the control corresponding to the voice command.

2. The method according to claim 1, wherein the voice command further comprises a command parameter, wherein determining the control corresponding to the voice command by the test framework calling unit based on the voice command further comprises:
acquiring a position of the control in the application program that is in the foreground running state on the current user interface by the test framework calling unit; and
determining whether an edit box is located on at least one position adjacent to the position of the control by the test framework calling unit, and in a case where one or more of edit boxes are determined, inputting the command parameter into any of the edit boxes; and
wherein executing the function corresponding to the control comprises:
based on the command parameter, executing the function corresponding to the control.

3. The method according to claim 2, wherein determining whether the edit box is located on at least one position adjacent to the position of the control comprises:
searching all edit boxes on the current user interface;
recognizing a boundary of each of the edit boxes; and
based on the boundary, determining a position of an edit box located on at least one position adjacent to the position of the control.

4. The method according to claim 1, wherein determining the control corresponding to the voice command by the test framework calling unit based on the voice command further comprises:
in a case where a matching process of the voice command with the character string of the control or the description character string of the control is unsuccessful, based on a test framework called by the test framework calling unit, acquiring an image of the application program that is in the foreground running state on the current user interface;
recognizing the image to determine a control icon in the image; and
matching the voice command with the control icon to determine the control corresponding to the voice command.

5. The method according to claim 1, before acquiring the voice input information, the method further comprising:
acquiring an application program starting command; and
based on the application program starting command, starting the application program in which the control is coded.

6. The method according to claim 1, wherein recognizing the voice input information to obtain the voice command comprises:
converting the voice input information into a character string;
matching the character string which is obtained by the converting with a preset voice command; and
based on a matching result, determining a voice command corresponding to the voice input information.

7. The method according to claim 6, wherein matching the character string which is obtained by the converting with the preset voice command comprises:
establishing a corresponding relationship set of character strings and preset voice commands;
based on template matching or deep learning, determining a voice command matched with the character string which is obtained by the converting in the set; and
matching the character string with the voice command which is determined.

8. A voice control device, comprising:
a memory and a processor,
wherein instructions are stored in the memory, and in a case where the processor processes the instructions, the processor executes the method according to claim 1.

9. A computer-executable non-transitory storage medium, in which computer program instructions are sorted, wherein in a case where a processor processes the instructions, the processor executes the method according to claim 1.

10. A voice control method, comprising:
acquiring a voice input information;
recognizing the voice input information to obtain a voice command;
determining a control corresponding to the voice command by a test framework calling unit based on the voice command, wherein the test framework calling unit is not in an application program in which the control is coded; and
executing a function corresponding to the control,
wherein determining the control corresponding to the voice command by the test framework calling unit based on the voice command comprises:
based on a test framework called by the test framework calling unit, acquiring an image of an application program that is in a foreground running state on a current user interface;
recognizing the image to determine a control icon in the image; and
matching the voice command with the control icon to determine the control corresponding to the voice command.

11. The method according to claim 10, wherein determining the control corresponding to the voice command by the test framework calling unit based on the voice command further comprises:
in a case where a matching process of the voice command with the control icon is unsuccessful, acquiring a control in the application program that is in the foreground running state on the current user interface by the test framework calling unit;
acquiring a character string of the control or a description character string of the control; and
matching the voice command with the character string of the control or the description character string of the control to determine the control corresponding to the voice command.

12. The method according to claim 10, wherein recognizing the image to determine the control icon in the image comprises:
performing contour extraction on the image to obtain at least one control region; and
performing image recognizing on the at least one control region to determine the control icon in the control region.

13. The method according to claim 12, wherein matching the voice command with the control icon to determine the control corresponding to the voice command comprises:
converting the control icon into a character string corresponding to a function of the control, and matching the character string which is corresponding to the function of the control with the voice command;
or,
converting the voice command into an icon corresponding to the voice command, and matching the icon which is corresponding to the voice command with the control icon.

14. The method according to claim 10, before acquiring the voice input information, the method further comprising:
- acquiring an application program starting command; and
- based on the application program starting command, starting the application program in which the control is coded.

15. The method according to claim 10, wherein recognizing the voice input information to obtain the voice command comprises:
- converting the voice input information into a character string;
- matching the character string which is obtained by the converting with a preset voice command; and
- based on a matching result, determining a voice command corresponding to the voice input information.

16. The method according to claim 15, wherein matching the character string which is obtained by the converting with the preset voice command comprises:
- establishing a corresponding relationship set of character strings and preset voice commands;
- based on template matching or deep learning, determining a voice command matched with the character string which is obtained by the converting in the set; and
- matching the character string with the voice command which is determined.

17. A voice control device, comprising:
- a memory and a processor,
- wherein instructions are stored in the memory, and in a case where the processor processes the instructions, the processor executes the method according to claim 10.

18. A computer-executable non-transitory storage medium, in which computer program instructions are sorted, wherein in a case where a processor processes the instructions, the processor executes the method according to claim 10.

19. A voice control device, comprising:
- a voice recognizing and semantic parsing unit, configured to acquire a voice input information, and to recognize the voice input information to obtain a voice command;
- a test framework calling unit, configured to, based on the voice command, determine a control corresponding to the voice command, wherein the test framework calling unit is not in an application program in which the control is coded;
- an execution unit, configured to execute a function corresponding to the control; and
- an image recognizing unit, configured to recognize an image in an application program in which the control is coded on a current user interface to determine a control icon in the image,
- wherein the test framework calling unit is further configured to match the voice command with the control icon to determine the control corresponding to the voice command.

20. The device according to claim 19, wherein the voice recognizing and semantic parsing unit is in a first module,
- the test framework calling unit and the image recognizing unit are in a second module, respectively, and
- the first module and the second module communicate with each other through inter-process communication.

* * * * *